(12) United States Patent
Sahoo et al.

(10) Patent No.: US 12,125,393 B2
(45) Date of Patent: Oct. 22, 2024

(54) SYSTEMS AND METHODS TO CORROBORATE AN EXTERNALLY RECOMMENDED FLIGHT PLAN CHANGE WITH FLIGHT MANAGEMENT SYSTEM

(71) Applicant: HONEYWELL INTERNATIONAL INC., Charlotte, NC (US)

(72) Inventors: Subhransu Sahoo, Bangalore (IN); Kalimulla Khan, Bangalore (IN); Raghu Shamasundar, Bangalore (IN); Sreenivasan Govindillam, Bangalore (IN); Richard Snyder, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 290 days.

(21) Appl. No.: 17/651,525

(22) Filed: Feb. 17, 2022

(65) Prior Publication Data

US 2023/0215281 A1 Jul. 6, 2023

(30) Foreign Application Priority Data

Jan. 5, 2022 (IN) .............................. 202211000567

(51) Int. Cl.
*G08G 5/00* (2006.01)
*B64D 45/00* (2006.01)
*H04W 4/42* (2018.01)

(52) U.S. Cl.
CPC ........... *G08G 5/0039* (2013.01); *B64D 45/00* (2013.01); *G08G 5/0013* (2013.01);
(Continued)

(58) Field of Classification Search
CPC ....... G06F 3/0488; G01C 23/00; G01C 25/00; G08G 5/0021; G08G 5/0039; B64D 43/00; B64D 45/00; B64D 2045/0075
See application file for complete search history.

(56) References Cited

U.S. PATENT DOCUMENTS 4,642,775 A 2/1987 Cline et al.
5,797,106 A 8/1998 Murray et al.
(Continued)

FOREIGN PATENT DOCUMENTS

EP 3660461 A1 6/2020
EP 3048424 B1 6/2021

*Primary Examiner* — David A Testardi
(74) *Attorney, Agent, or Firm* — Lorenz & Kopf LLP (57) ABSTRACT

Systems and methods for coordinating with a flight management system (FMS) on-board an aircraft to determine whether a flight plan (FP) change generated by an external device is valid. The method includes generating the FP change, which includes a deviation to the intended FP and a savings parameter associated with a parameter of the intended FP, responsive to weather data and aircraft state data; generating a lateral display showing the intended FP and an alphanumeric window with the FP change; transmitting the FP change to the FMS; receiving, from the FMS, a travel path and a calculated parameter for the travel path, generated by the FMS responsive to the FP change; determining whether the travel path realizes the savings parameter by comparing the calculated parameter to the savings parameter; and, displaying either a selectable graphical user interface (GUI) object to implement the FP change, or a warning based thereon.

20 Claims, 6 Drawing Sheets

(52) U.S. Cl.
CPC ......... *G08G 5/0021* (2013.01); *G08G 5/0091* (2013.01); *H04W 4/42* (2018.02); *B64D 2045/0075* (2013.01)

(56) References Cited

U.S. PATENT DOCUMENTS

| | | | | |
|---|---|---|---|---|
| 6,922,631 | B1* | 7/2005 | Dwyer | G01C 23/00 |
| | | | | 701/467 |
| 10,424,209 | B2* | 9/2019 | Borgyos | G08G 5/02 |
| 10,946,977 | B2 | 3/2021 | Mohan et al. | |
| 10,969,227 | B2 | 4/2021 | Miller | |
| 10,991,255 | B2 | 4/2021 | Hochwarth et al. | |
| 2009/0319100 | A1* | 12/2009 | Kale | G08G 5/0013 |
| | | | | 701/4 |
| 2009/0319944 | A1* | 12/2009 | Chikkegowda | G01C 23/00 |
| | | | | 715/804 |
| 2010/0030401 | A1* | 2/2010 | Rogers | G08G 5/0039 |
| | | | | 701/3 |
| 2010/0198433 | A1* | 8/2010 | Fortier | G01C 23/00 |
| | | | | 701/14 |
| 2010/0332054 | A1* | 12/2010 | Brandao | G08G 5/0013 |
| | | | | 701/3 |
| 2013/0345905 | A1* | 12/2013 | Parthasarathy | G01C 23/00 |
| | | | | 701/3 |
| 2015/0260525 | A1* | 9/2015 | Parthasarathy | G01C 21/20 |
| | | | | 701/538 |
| 2015/0371544 | A1* | 12/2015 | Mere | G08G 5/0039 |
| | | | | 701/3 |
| 2016/0180715 | A1* | 6/2016 | Burke | G08G 5/0091 |
| | | | | 701/467 |
| 2016/0293016 | A1* | 10/2016 | Rein-Weston | G05D 1/0005 |
| 2017/0372619 | A1* | 12/2017 | Borgyos | G08G 5/0013 |
| 2018/0075758 | A1* | 3/2018 | Martinez | G08G 5/0052 |
| 2018/0268721 | A1* | 9/2018 | McCullough | G06F 3/04845 |
| 2018/0351966 | A1 | 12/2018 | Toews | |
| 2019/0108466 | A1* | 4/2019 | Khan | G05D 1/0005 |
| 2019/0114927 | A1* | 4/2019 | McCullough | G08G 5/0039 |
| 2019/0215379 | A1* | 7/2019 | Selvarajan | H04L 67/06 |
| 2020/0168103 | A1* | 5/2020 | Holder | G06F 3/0482 |
| 2020/0168104 | A1* | 5/2020 | Holder | G08G 5/0039 |
| 2020/0211069 | A1* | 7/2020 | Chaubey | G08G 5/0021 |
| 2020/0320885 | A1* | 10/2020 | Subramaniyan | G08G 5/0034 |
| 2020/0342771 | A1 | 10/2020 | Mohan et al. | |
| 2021/0090445 | A1* | 3/2021 | Molnar | G08G 5/0039 |
| 2021/0097869 | A1 | 4/2021 | Piradi | |
| 2021/0192961 | A1* | 6/2021 | Lebbos | G08G 5/0039 |
| 2021/0247513 | A1* | 8/2021 | Song | G08G 5/0078 |
| 2022/0068148 | A1* | 3/2022 | Roger | G08G 5/0091 |
| 2022/0406198 | A1* | 12/2022 | Sacle | G08G 5/0039 |
| 2024/0029571 | A1* | 1/2024 | Iijima | G08G 5/0021 |

* cited by examiner

SYSTEMS AND METHODS TO CORROBORATE AN EXTERNALLY RECOMMENDED FLIGHT PLAN CHANGE WITH FLIGHT MANAGEMENT SYSTEM

CROSS-REFERENCE TO RELATED APPLICATION

This application claims priority to India Provisional Patent Application No. 202211000567, filed Jan. 5, 2022, the entire content of which is incorporated by reference herein.

TECHNICAL FIELD

The following disclosure generally relates to flight guidance systems for mobile platforms. More particularly, the following disclosure relates to systems and methods to corroborate an externally recommended flight plan change with flight management system.

BACKGROUND

In the continued pursuit of connectivity, there is lot of work going on in finding the most optimum way to interface between the on-board systems and external (i.e., off-board) systems. Technical problems presented for this connectivity include data bandwidth capability, pilot training, regulations, work overload, and security.

Connectivity to the cockpit can enable sending flight plan and other critical data to Avionics. However, it is possible that the effect of external data brought in via connectivity can produce a different result on avionics systems, as compared to the results conceived by the external devices. As a technical solution, pilot-in-command philosophy, and regulatory objectives, demand that information received from an external source shall be reviewed by the pilot before data is transferred to the avionics. With more and more features getting connected support, connectivity can place tremendous pressure on a pilot and be an ever more challenging technical problem.

Accordingly, it is desirable to develop systems and methods that provide efficient mechanisms for pilot review. Improved systems and methods that can coordinate with a flight management system (FMS) on-board an aircraft to determine whether a flight plan (FP) change generated by an external device is valid are desired. Furthermore, other desirable features and characteristics of the disclosure will become apparent from the subsequent detailed description and the appended claims, taken in conjunction with the accompanying drawings, brief summary, technical field, and this background of the disclosure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system that coordinates with a flight management system (FMS) on-board an aircraft to determine whether a flight plan (FP) change generated by an external device is valid, comprising: a FP deviation module located on the external device, the FP deviation module configured to: receive an intended FP for the aircraft; receive aircraft state data for the aircraft; receive weather data; generate the FP change, which includes a deviation to the intended FP and a savings parameter associated with a parameter of the intended FP, responsive to the weather data and the aircraft state data; generate a lateral display on a display device on the external device, the lateral display showing the intended FP; overlay an alphanumeric window on the lateral display, indicating therein the FP change; and transmit the FP change to the FMS; a reformulation module located on-board the aircraft, the reformulation module in communication with the FMS and configured to: receive the FP change; construct a travel path that incorporates the deviation to the intended FP; calculate the parameter for the travel path; transmit the travel path and calculated parameter to the FP deviation module; and the FP deviation module further configured to: receive the travel path and calculated parameter; determine whether the travel path realizes the savings parameter by comparing the calculated parameter to the savings parameter; display a selectable graphical user interface (GUI) object in the alphanumeric window when the travel path realizes the savings parameter; display a warning GUI object when the travel path does not realize the savings parameter; and transmit a valid notification to the FMS responsive to detecting a user selection of the selectable GUI object.

Also provided is a processor-implemented method for coordinating with a flight management system (FMS) on-board an aircraft to determine whether a flight plan (FP) change generated by an external device is valid, comprising: at the external device, performing the operations: receiving an intended FP for the aircraft; receiving aircraft state data for the aircraft; receiving weather data; generating the FP change, which includes a deviation to the intended FP and a savings parameter associated with a parameter of the intended FP, responsive to the weather data and the aircraft state data; generating a lateral display on a display device on the external device, the lateral display showing the intended FP; overlaying an alphanumeric window on the lateral display, indicating therein the FP change; and transmitting the FP change to the FMS; receiving, from the FMS, a travel path and a calculated parameter for the travel path, generated by the FMS responsive to the FP change; determining whether the travel path realizes the savings parameter by comparing the calculated parameter to the savings parameter; displaying a selectable graphical user interface (GUI) object on the alphanumeric overlay when the travel path realizes the savings parameter; displaying a warning GUI object when the travel path does not realize the savings parameter; and transmitting a valid notification to the FMS responsive to detecting a user selection of the selectable GUI object.

Provided is another system that coordinates with a flight management system (FMS) on-board an aircraft to determine whether a flight plan (FP) change generated by an external device is valid. The system includes: a FP deviation module located on the external device, the FP deviation module configured to: receive an intended FP from the FMS; receive aircraft state data for the aircraft; receive weather data; generate the FP change, which includes a deviation to the intended FP and a savings parameter associated with a parameter of the intended FP, responsive to the weather data and the aircraft state data; generate a lateral display on a display device on the external device, the lateral display showing the intended FP; overlay an alphanumeric window on the lateral display, the overlay indicating the FP change; and transmit the FP change to the FMS; receive, from the FMS, a travel path and a calculated parameter for the travel path, generated by the FMS responsive to the FP change; determine whether the travel path realizes the savings parameter by comparing the calculated parameter to the savings parameter; display a selectable graphical user interface (GUI) object on the alphanumeric overlay when the travel path realizes the savings parameter; display a warning GUI object when the travel path does not realize the savings parameter; and transmit a valid notification to the FMS responsive to detecting a user selection of the selectable GUI object Furthermore, other desirable features and characteristics of the system and method will become apparent from the subsequent detailed description and the appended claims, taken in conjunction with the accompanying drawings and the preceding background.

BRIEF DESCRIPTION OF THE DRAWING FIGURES

At least one example of the present invention will hereinafter be described in conjunction with the following figures, wherein like numerals denote like elements, and.

DETAILED DESCRIPTION

The following detailed description is merely exemplary in nature and is not intended to limit the invention or the application and uses of the invention. As used herein, the word "exemplary" means "serving as an example, instance, or illustration." Thus, any weather or flight display system or method embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, programmable logic arrays, application specific integrated circuits, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

As mentioned, connectivity to the cockpit can enable sending flight plan and other critical data to avionics, but it is possible that the effect of external data brought in via connectivity can produce a different result on avionics systems, as compared to the results conceived by the external devices. Available technical solutions include a pilot-in-command philosophy, and regulatory objectives, that demand that information received from an external source shall be reviewed by the pilot before data is transferred to the avionics. However, available solutions are lacking, in that, with more and more features getting connected support, connectivity can place tremendous pressure on a pilot and be an ever more challenging technical problem.

A technical solution is disclosed herein in the form of systems and methods to corroborate an externally recommended flight plan change with flight management system. Said differently, the provided technical solution embodies systems and methods that coordinate with a flight management system (FMS) on-board an aircraft to determine whether a flight plan (FP) change generated by an external device is valid. Proposed embodiments provide enhancements to information provided by existing PED displays by presenting or overlaying additional GUI objects and alphanumerical information on a predefined area on the lateral display 115, as described herein. In various embodiments, these overlays or presentations provide a quick and intuitive visual affirmation or alert responsive to comparing FP changes proposed by an external device and what the on-board avionics calculate. Accordingly, provided embodiments provide an objectively improved human-machine interface that can significantly reduce pilot workload and potential pilot errors.

Figure 1:
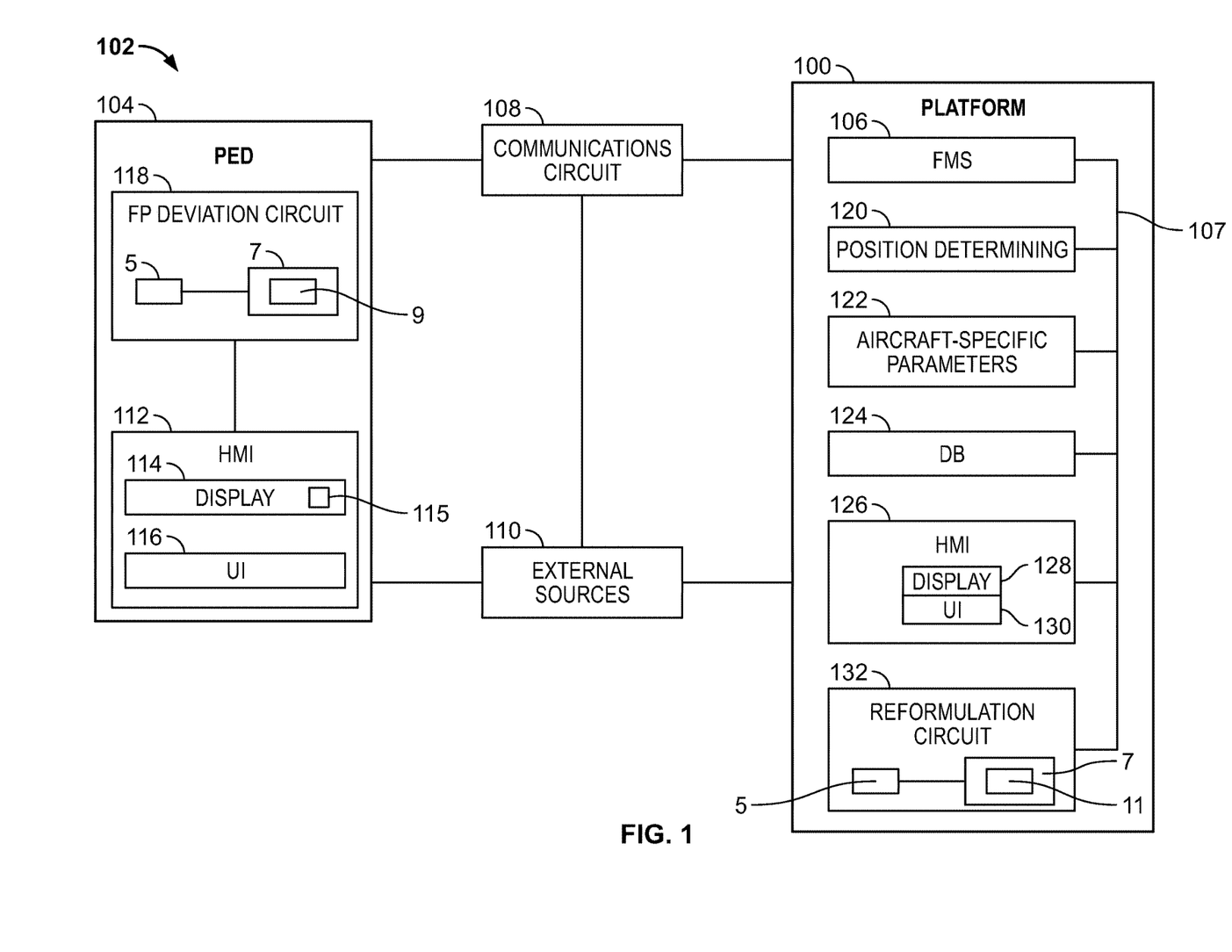
FIG. 1 shows a functional block diagram of a system to corroborate an externally recommended flight plan change with flight management system, in accordance with exemplary embodiments of the present disclosure.

FIG. 1 is a block diagram showing one or more systems to corroborate an externally recommended flight plan change with flight management system (FMS) (shortened herein to "system" 102), in accordance with an exemplary and non-limiting embodiment of the present disclosure. As used herein, the corroboration means the system 102 coordinates with a flight management system (FMS) on-board an aircraft to determine whether a flight plan (FP) change generated by an external device is valid, when it is valid, it is corroborated and when it is not valid, it is not corroborated. The system 102 includes the external device, a portable electronic device (PED) 104, in communication with the FMS 106 of a mobile platform. In various embodiments, the mobile platform is an aircraft 100. Aircraft 100 may be any type of vehicle that can travel through the air (i.e., without physical contact with terrain or water). As such, aircraft 100 may be any type of airplane (regardless of size or propulsion means, ranging from large, turbine-powered commercial airplanes to small, electrically-powered drones), rotorcraft (helicopter, gyrocopter), lighter-than-air vessel (hot-air balloon, blimp), or glider, for example. Aircraft 100 may be "manned" in the conventional sense that the flight crew is present within the aircraft 100, or it may be manned remotely.

As schematically depicted in FIG. 1, system 102 includes communications circuit 108, configured to support communications between the PED 104 and the FMS 106 on the aircraft 100, and manage security and verification between the PED 104 and the FMS 106. In various embodiments, the communications circuit 108 includes the hardware and software to support one or more communication protocols for real-time wireless communication between the PED 104, the FMS 106, and various external sources 110. In various embodiments, the communications circuit 108 supports wireless data exchange over a communications network, such as bidirectional pilot-to-ATC (air traffic control) communications via a datalink; a public or private network implemented in accordance with Transmission Control Protocol/Internet Protocol architectures or other conventional protocol standards. The communications circuit 108 provides encryption and mutual authentication techniques, as appropriate, to ensure data security. Although illustrated as a separate functional block, in some embodiments, the communications circuit 108 is located on-board the aircraft 100. In some embodiments, the communications circuit 108 is located onboard the PED 104. In some embodiments, the communications circuit 108 is disintegrated, comprising some components on the PED 104 and some components on the aircraft 100. In still other embodiments, the communications circuit 108 is located at an external source 110, such as a cloud server, or a ground station.

The external sources 110 (i.e., external to the aircraft 100 and external to the PED 104) may include air traffic control (ATC), ground stations, a weather subscription services that provide weather data, other subscription services, a traffic monitoring service, a neighbor traffic, and the like.

As may be appreciated, the FMS 106 is integrated within an aircraft 100, and in communication with various aircraft 100 on-board systems. Among the functions of the FMS 106, in various embodiments, the FMS 106 is the source of an intended FP. The intended flight plan ("intended FP") may be a subset or part of an operational flight plan (OFP). The intended flight plan may include a series of intended geospatial midpoints between a departure and an arrival, as well as parameters (also referred to as performance data) associated with each of the geospatial midpoints (non-limiting examples of the parameters include estimated fuel on board (EFOB), estimated time of arrival (ETA), intended airspeed, intended altitude, intended acceleration, intended flight path angle, and the like).

The PED 104 is a portable device that a user may carry into the cockpit of the aircraft 100 and rely on during operation of the aircraft 100. The PED 104 may take the form of an electronic flight bag (EFB), tablet, cellular phone, or the like. The PED 104 includes a human-machine interface (HMI) 112. The HMI 112 may generally include a display device 114 and at least one user input device (UI) 124. In various embodiments, the HMI 112 includes at least one instance of an integration of the user input device 116 and a display device 114 (e.g., a touch screen display). In various embodiments, the user input device 116 may be one or more of a keyboard, a cursor control device, a voice input device, a gesture input apparatus, or the like.

As is described in more detail below, the system 102 may utilize the intended FP from the FMS 106 to generate a lateral display 115 showing the intended FP on the display device 114 of the PED 104. Embodiments of the lateral display 115 include two-dimensional (2D) horizontal (i.e., lateral) navigation displays and/or three dimensional (3D) horizontal navigational displays, such as a Primary Flight Display (PFD) or an exocentric 3D avionic display. In various embodiments, the lateral display 115 includes an FMS page, representing information calculated by the FMS 106. In various embodiments, the system 102 may overlay on the lateral display 115 graphical user interface (GUI) objects and alphanumerical input/output displays that are similar to those commonly presented on the screens of MCDUs, and Control Display Units (CDUs) generally.

In various embodiments, the tasks and functions in the PED 104 are performed by a flight plan (FP) deviation circuit 118, located on the PED 104, the FP deviation circuit 118 being programmed or configured to cause the generation and display of the lateral display 115. In addition, via various display and graphics systems processes, the FP deviation circuit 118 may command and control the generation, by the HMI 112, of a variety of graphical user interface (GUI) objects or elements described herein, including, for example, tabs, buttons, sliders, and the like, which are used to prompt a user to interact with the HMI to provide user input, and to activate respective functions and provide user feedback, responsive to received user input at the GUI object.

With respect to the present invention, the FP deviation circuit 118 performs the tasks of receiving the intended FP from the FMS 106; receiving aircraft state data for the aircraft from position-determining system 120; and receiving weather data from external source 110. The FP deviation circuit 118 generates a FP change, responsive to the weather data and the aircraft state data. The FP change includes a deviation to the intended FP and a savings parameter gained by the FP change, the savings parameter being associated with a parameter of the intended FP. In one non-limiting example, the deviation to the intended FP is a route change, the parameter is ETA, the savings parameter is be a shorter/sooner ETA. In another non-limiting example, the deviation to the intended FP is an altitude change (e.g., to avoid a severe weather cell), the parameter is EFOB, the savings parameter can be an increased EFOB. The FP deviation circuit 118 generates the FP change dynamically responsive to changes in weather data and changes in aircraft state data. In various embodiments, the savings parameter embodies a recommended deviation for a safety reason, such as, to avoid a weather hazard.

As mentioned, the FP deviation circuit 118 generates the lateral display on the display device 114 on the external device (PED 104), showing the intended FP. The FP deviation circuit 118 overlays an alphanumeric window on the lateral display, the overlay indicating the components (e.g., parameters, waypoints, savings parameters, etc.) of the FP change. The FP deviation circuit 118 transmits the FP change to the FMS 106, and the reformulation circuit 132 onboard the aircraft 100 processes the FP change.

In various embodiments, to process the FP change, the reformulation circuit 132 constructs a travel path that incorporates the deviation to the intended FP, and then calculates the parameter for the travel path based on its construction of the travel path. Returning to the above examples, the FMS 106 calculates an ETA for the travel path, or the FMS 106 calculates an EFOB for the altitude change. The reformulation circuit 132 transmits the travel path and calculated parameter back to the PED 104.

Responsive to receiving the travel path and calculated parameter, the FP deviation circuit 118 determines whether the travel path realizes the savings parameter by comparing the calculated parameter to the savings parameter. Returning to the above examples, the FP deviation circuit 118 determines whether the calculated ETA embodies the savings parameter, or whether the calculated EFOB embodies the savings parameter. When the FP deviation circuit 118 determines, via this comparison, that the travel path proposed by the external device realizes the savings parameter, this is a corroboration or validation.

Responsive to determining whether the travel path realizes the savings parameter, the FP deviation circuit 118 (*a*) displays a selectable graphical user interface (GUI) object on the alphanumeric window of the lateral display 115 when the travel path realizes the savings parameter (the selectable GUI object being an intuitively distinguishable affirmation, described in more detail below); and (*b*) displays a warning GUI object on the alphanumeric window of the lateral display 115 when the travel path does not realize the savings parameter. Additionally, the FP deviation circuit 118 transmits a valid notification to the FMS 106 responsive to detecting a user selection of the selectable GUI object.

In various embodiments, the FP deviation circuit 118 (and the reformulation circuit 132, described in more detail below) may be realized as an enhanced computer system. As shown in FIG. 1, the FP deviation circuit 118 is depicted as an enhanced computer system having one or more processors 5 operationally coupled to computer-readable storage media or memory 7, having stored therein at least one novel firmware or software program 9 (generally, computer-readable instructions that embody an algorithm) for carrying-out the various process tasks, calculations, and control/display functions described herein. The memory 7, may include volatile and nonvolatile storage in read-only memory (ROM), random-access memory (RAM), and keep-alive memory (KAM), for example. KAM is a persistent or non-volatile memory that may be used to store various operating variables while the processor 5 is powered down. The memory 7 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 5.

During operation, the processor 5, and hence the FP deviation circuit 118, may be programmed with and execute the at least one firmware or software program (for example, program 9, described in more detail below) that embodies an algorithm for receiving, processing, enabling, generating, updating, and rendering, described herein, to thereby perform the various process steps, tasks, calculations, and control/display functions described herein. Likewise, the reformulation circuit 132 described below may be implemented as an enhanced computer system programmed to execute the at least one firmware or software program 11.

Returning to the aircraft 100, during operation, the FMS 106 may be in communication with, inter alia, an on-board a position-determining system 120, such as a navigation system; a source of aircraft-specific parameters 122; a database 124; and an on-board HMI 126. In various embodiments, a reformulation circuit 132 communicates with the other on-board components of the aircraft 100 via a communication bus 107.

The position-determining system 120 may include a variety of sensors and performs the function of measuring and supplying aircraft state data and measurements to reformulation circuit 132 and other aircraft systems (via the communication bus 107) during aircraft operation. In various embodiments, the aircraft state data includes, without limitation, one or more of system measurements providing a location (e.g., latitude and longitude), Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data. The position-determining system 120 may be realized as one or more of a global positioning system (GPS), inertial reference system (IRS), or a radio-based navigation system (e.g., VHF omni-directional radio range (VOR) or long-range aid to navigation (LORAN)), air data system, and it may include one or more navigational radios or other sensors suitably configured to support operation of the aircraft 100.

The source of aircraft-specific parameters 122 generally provides, for each of a variety of aircraft 100 subsystems, current status and performance data. Examples of aircraft-specific parameters include engine thrust level, fuel level, flap configuration, braking status, temperature control system status, and the like. In an example, the aircraft system may be landing gear, and its status may be an inefficiency, such as, that it is non-retracting. As may be appreciated, the source of aircraft-specific parameters 122 may therefore include a variety of components, such as on-board detection sensors, which may be operationally coupled to the reformulation circuit 132, central management computer, or FMS.

Database 124 is a computer-readable storage media or memory. In various embodiments, onboard database 124 stores two- or three-dimensional map data, including airport features data (e.g., taxi routes and runways), geographical (terrain), buildings, bridges, and other structures, street maps, and may include a navigation database (NAVDB), having stored therein navigation communication frequencies.

The on-board HMI 126 generally includes a display system configured to receive and process information from various on-board aircraft systems, sensors, and databases (generally supplied via the communication bus 107), perform display processing and graphics processing, and to drive the one or more display device(s) 128 to render features in one or more avionic displays. The term "avionic display" is defined as synonymous with the term "aircraft-related display" and "cockpit display" and encompasses displays generated in textual, graphical, cartographical, and other formats. In various embodiments, the avionic display is a primary flight display (PFD) or a navigation display. In various embodiments, the avionic display can be, or include any of various types of lateral displays and vertical situation displays on which map views and symbology, text annunciations, and other graphics pertaining to flight planning are presented for a pilot to view. In various embodiments, the avionic display includes an FMS page that displays at least the active flight plan, as shown in the below described figures.

When the system 102 is utilized for a manned aircraft, the display device 128 may be affixed to the static structure of the Aircraft cockpit as, for example, a Head Up Display (HUD) unit, or a Head Down Display (HDD).

As mentioned, the reformulation circuit 132 on-board the aircraft 100 may be implemented as an enhanced computer system having one or more processors 5 operationally coupled to computer-readable storage media or memory 7, having stored therein at least one novel firmware or software program 11 (generally, computer-readable instructions that embody an algorithm) for carrying-out the various process tasks, calculations, and control/display functions described herein. In some embodiments, the reformulation circuit 132 functionality may be integrated within a preexisting mobile platform management system, avionics system, cockpit display system (CDS), flight controls system (FCS), or aircraft flight management system (FMS). Although the reformulation circuit 132 is shown as an independent functional block, onboard the aircraft 100, in other embodiments, it may exist in the PED 104, the PED 104 may be an electronic flight bag (EFB), a tablet, a cellular phone, or the like.

It should be appreciated that aircraft 100 includes many more additional features (systems, databases, etc.) than the illustrated systems 106, 120-130. For purposes of simplicity of illustration and discussion, however, the illustrated aircraft 100 omits these additional features.

In some embodiments, the system 102 does not require the components onboard the platform 100, but just to send and receive signals as follows. As before, the system 102 coordinates with a flight management system (FMS) on-board an aircraft to determine whether a flight plan (FP) change generated by an external device is valid. The system 102 includes: a FP deviation module located on the external device, the FP deviation module configured to: receive an intended FP from the FMS; receive aircraft state data for the aircraft; receive weather data; generate the FP change, which includes a deviation to the intended FP and a savings parameter associated with a parameter of the intended FP, responsive to the weather data and the aircraft state data; generate a lateral display on a display device on the external device, the lateral display showing the intended FP; overlay an alphanumeric window on the lateral display, the overlay indicating the FP change; and transmit the FP change to the FMS; receive, from the FMS, a travel path and a calculated parameter for the travel path, generated by the FMS responsive to the FP change; determine whether the travel path realizes the savings parameter by comparing the calculated parameter to the savings parameter; display a selectable graphical user interface (GUI) object on the alphanumeric overlay when the travel path realizes the savings parameter; display a warning GUI object when the travel path does not realize the savings parameter; and transmit a valid notification to the FMS responsive to detecting a user selection of the selectable GUI object.

Figure 2:
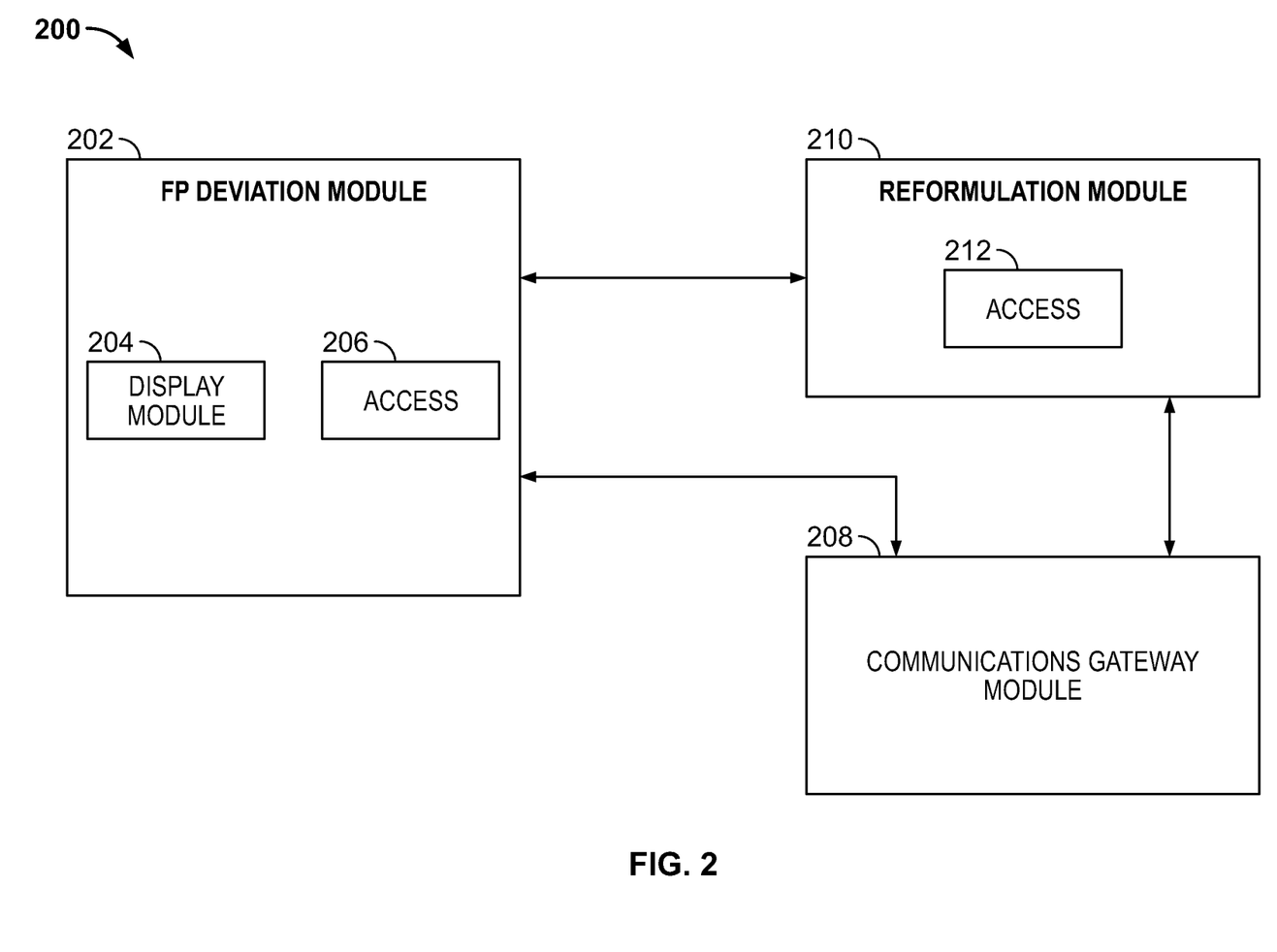
FIG. 2 is an architectural block diagram of one or more application modules operating in the system of FIG. 1, in accordance with exemplary embodiments of the present disclosure.

Turning to FIG. 2, the term "module," as appearing herein, broadly encompasses those components utilized to carry-out or otherwise support the processing functionalities of the system 102. Accordingly, in various embodiments, the functionality of the FP deviation circuit 118 and/or the functionality of the reformulation circuit 132 can be performed by respective application modules implemented as a programmable logic array, application specific integrated circuit, system on a chip (SOC), or other similar firmware, as well as by a combination of any number of dedicated or shared processors, flight control computers, navigational equipment pieces, computer-readable storage devices, power supplies, storage devices, interface cards, and other standardized components.

FIG. 2 is an architectural block diagram of one or more application modules operating in the system 102, in accordance with exemplary embodiments of the present disclosure. A FP deviation module 202 can be located on the external device (PED 104), the FP deviation module configured to: receive an intended FP for the aircraft; receive aircraft state data for the aircraft; and receive weather data. The FP deviation module 202 generates the FP change, which includes a deviation to the intended FP and a savings parameter associated with a parameter of the intended FP, responsive to the weather data and the aircraft state data. The FP deviation module 202 generates a lateral display on a display device on the external device, the lateral display showing the intended FP, and overlays an alphanumeric window on the lateral display, the overlay indicating the FP change; and the FP deviation module 202 transmits the FP change to the FMS. The FP deviation module 202 may include a display module configured to perform the graphics processing, drive the display device 114, and detect/interpret user input from the HMI 112. The FP deviation module 202 may include an access module 206, configured to perform the authentication and validation protocols with the communications gateway module 208.

As mentioned above, the tasks and operations of communications gateway module 208 may be incorporated into the FP deviation module 202, or the reformulation module 210. In various embodiments, this is represented by access module 206 and/or access module 212.

The reformulation module 210 is located on-board the aircraft 100 and is configured to receive the FP change; construct a travel path that incorporates the deviation to the intended FP; calculate the parameter for the travel path; and transmit the travel path and calculated parameter to the FP deviation module. In various embodiments, the reformulation module 210 is configured to generate a temporary visualization of the FP change for display on an avionic display in a cockpit of the aircraft (e.g., on the on-board HMI 126). The reformulation module 210 may include an access module 212, configured to perform the authentication and validation protocols with the communications gateway module 208.

Figure 3:
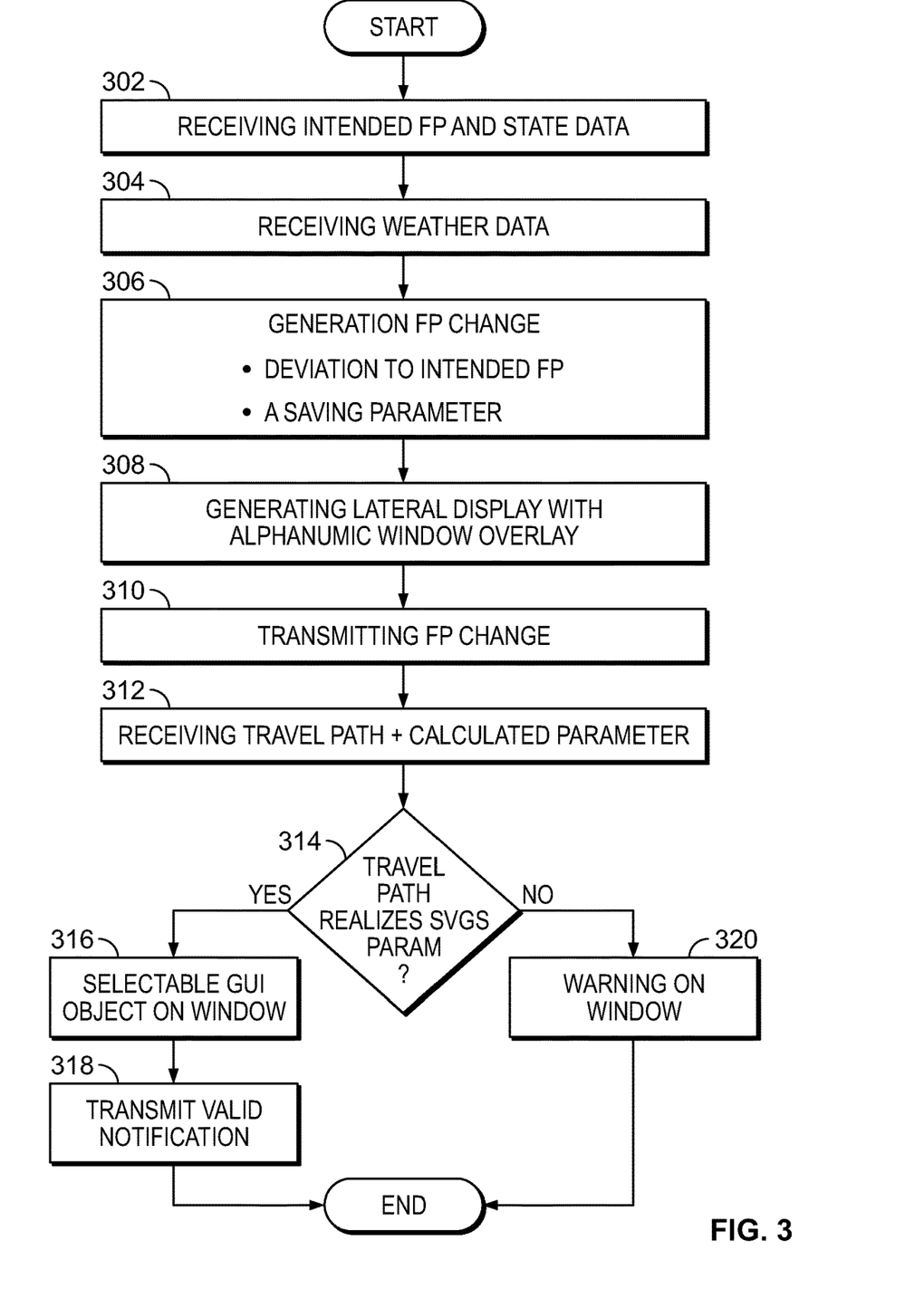
FIG. 3 is a flowchart illustrating a method to corroborate an externally recommended flight plan change with flight management system, in accordance with exemplary embodiments of the present disclosure.

Turning now to FIG. 3, and with continued reference to FIGS. 1-2, a flowchart of a method 300 method for suggesting, on an avionic display in an aircraft, a communication frequency that is relevant to a context of the aircraft is described, in accordance with exemplary embodiments of the present disclosure. For illustrative purposes, the following description of method 300 may refer to elements mentioned above in connection with FIGS. 1-2, for example, the tasks/operations performed by the FP deviation circuit 118 and the tasks/operations performed by the reformulation circuit 132. In practice, portions of method 300 may be performed by different components of the described system. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

At 302, an intended FP for the aircraft and aircraft state data for the aircraft are received by the system 102. At 302, the weather data is received. At 306, the FP change is generated, dynamically, responsive to the weather data and the aircraft state data. As described above, the FP change includes at least one deviation to the intended FP and includes at least one savings parameter associated with the at least one deviation. At 306, the method 300 is generating a lateral display on a display device on the external device, the lateral display showing the intended FP, and having overlaid thereon an alphanumeric window indicating therein the FP change. At 310, the FP change is transmitted to the FMS 106, generally through the communications circuit 108, and using authentication protocols.

At 312, the method 300 is receiving, from the FMS 106, a travel path and a calculated parameter for the travel path, generated by the FMS responsive to the FP change. At 314, the method 300 determines whether the travel path realizes the savings parameter. At 316, when the travel path realizes the savings parameter, a selectable GUI object is displayed on the alphanumeric window on the lateral display 115, prompting the user to select the travel path for use by the FMS 106. At 318, responsive to detecting a user selection of the selectable GUI object, the method 300 transmits a valid notification to the FMS 106. At 318, when the travel path does not realize the savings parameter, a warning GUI object is displayed on the alphanumeric window on the lateral display 115. After 318 or 320, the method 300 may end or return to 302.

Figure 4:
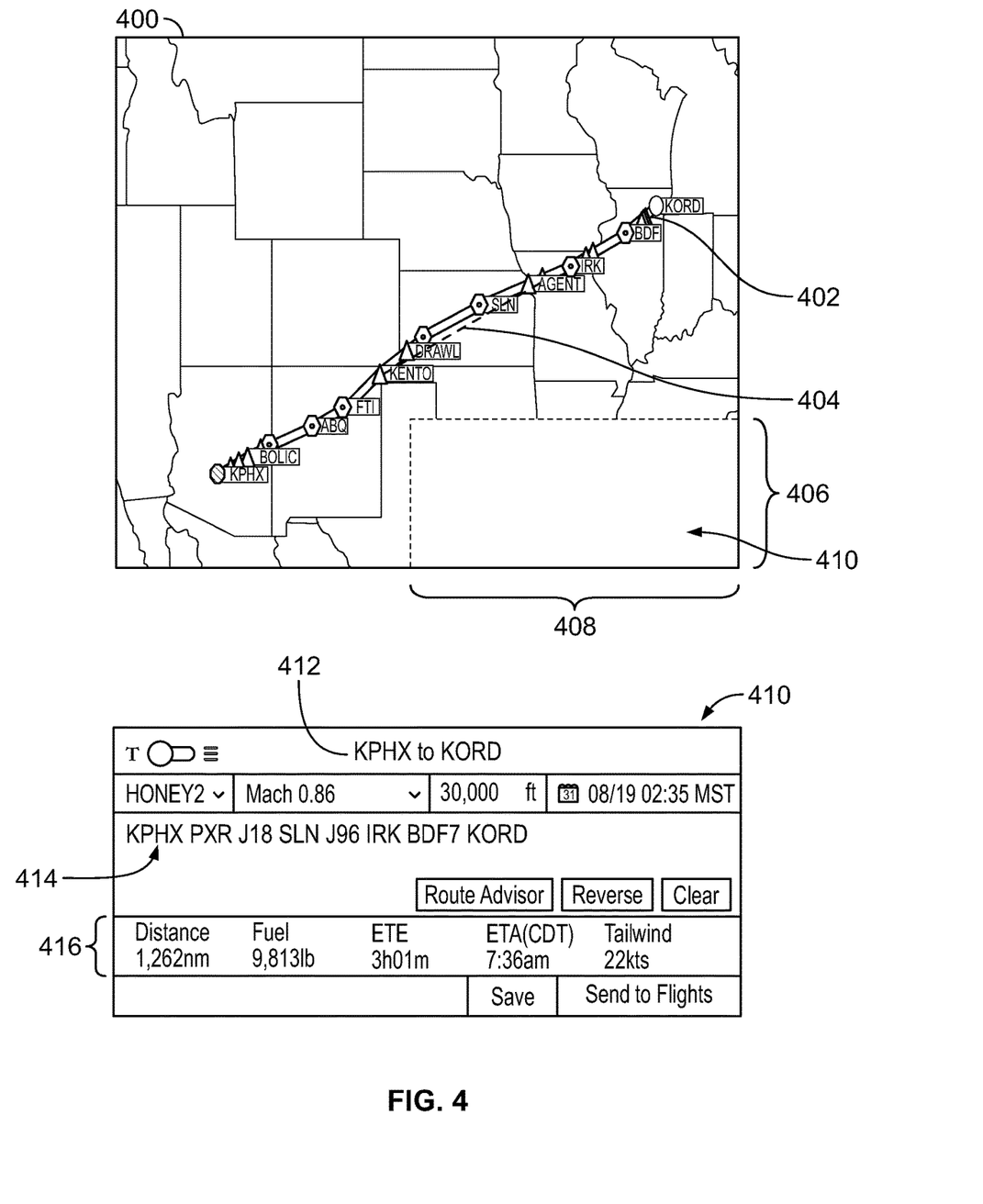
FIGS. 4-6 are illustrations of displayed images provided by embodiments described herein.

FIG. 4 provides an example of the lateral display 115 and the alphanumeric overlay, as embodiments may show on the PED 104. In FIG. 4, the lateral display 400 indicates with a solid line an intended flight plan 402 from KPHX to KORD. A dashed line 404 indicates a FP change generated at the PED 104. The area on the lateral display 115 defined by length 408 and height 406 is the area for the alphanumeric overlay 410.

Alphanumeric overlay 410 is shown, expanded for ease of reading. "KPHX to KORD" is displayed as a header on the alphanumeric overlay 410. From left to right, at 414, some waypoints on the path deviation are shown. From left to right, at 416, some parameters associated with the FP change (deviation) are shown. Distance is 1,262 nautical miles, fuel on-board is 9.813 lb, the ETA is 7:36 AM (CDT), and the tailwind is 22 kts. In various embodiments, this information is the FP change transmitted to the FMS 106.

Figure 5:
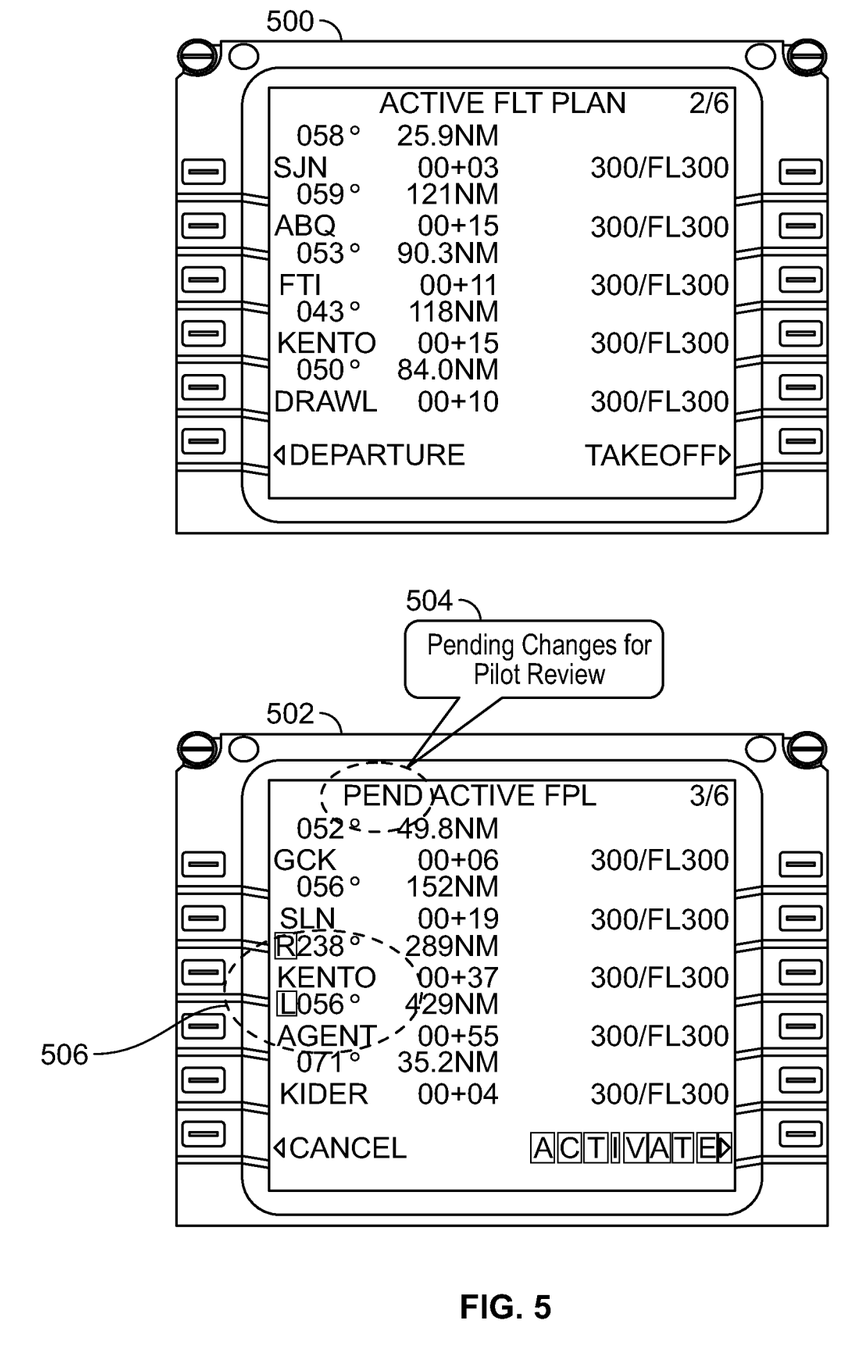

In FIG. 5, a first FMS page 500 is depicted, and a second FMS page 502 is depicted, showing the FP change proposed by the PED 104. In some embodiments, these FMS pages are depicted on the display device of the PED 104, side-by-side with the lateral display 115. In some embodiments, these FMS pages are depicted on the display device 128 of the on-board HMI 126. The system 102 may display on the FMS page 502, text indicating that this is pending (504), and some of the waypoint and/or parameter changes of the FP change (506).

Figure 6:
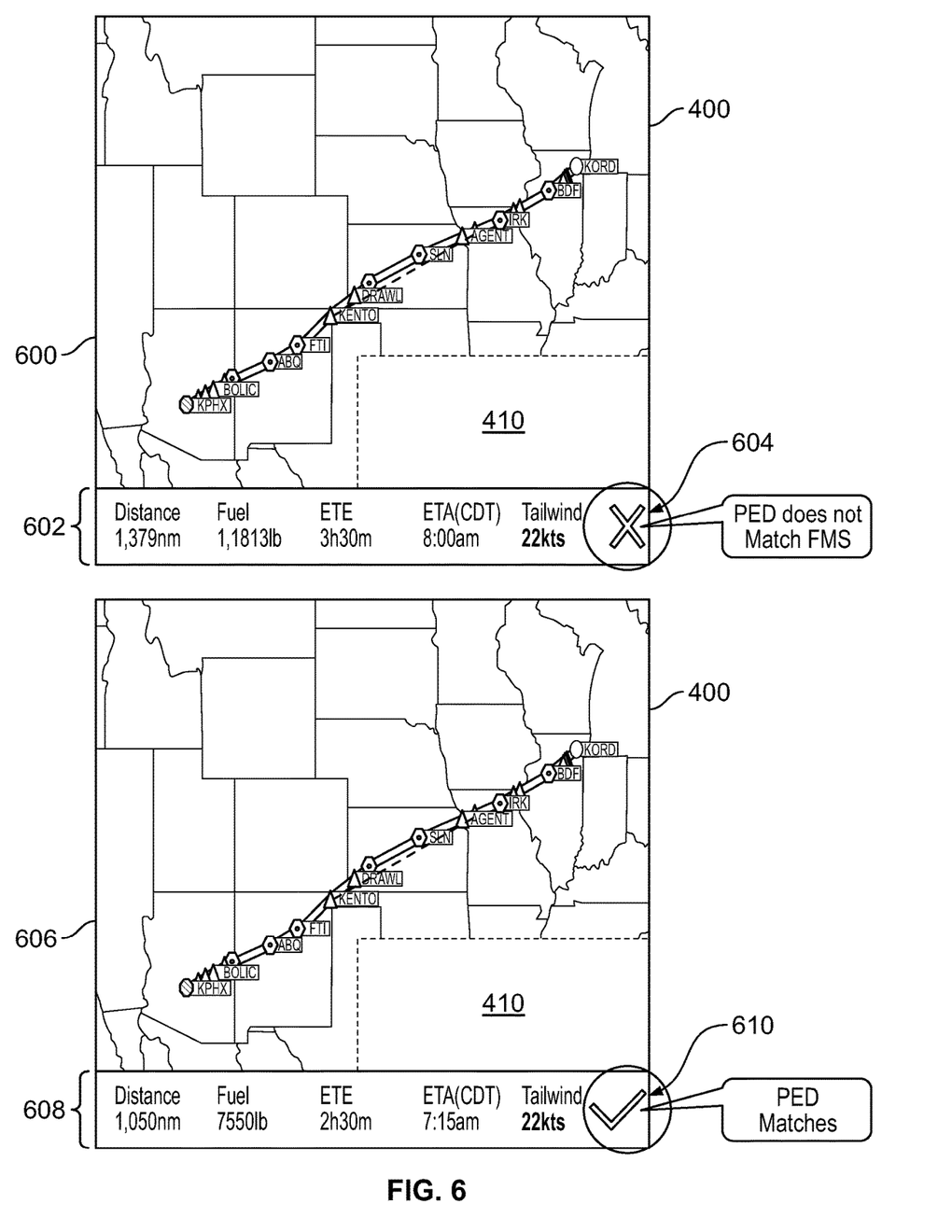

FIG. 6 illustrates the notifications and warnings that may be displayed on the display device of the PED 104, responsive to comparing information from the FMS 106 with the information the PED initially calculated. For a mis-match (per a "no" at step 314), image 600 displays a banner 602 extending from left to right at the bottom of the lateral display 115, but not covering the intended path or deviation, showing calculated parameters from the FMS 106 and an alert 604. The banner 602 displays the one or more calculated parameters received from the FMS 106. From left to right: distance is 1,379 miles (longer than the PED calculation), fuel 1,181 lb. (less than PED calculated), ETA is 8:00 AM CDT (later than the PED calculated). In this example the alert 604 is an X, in other examples, it can be a red X or other intuitive indicator of a warning, such as a slash in a circle.

For a match (per a "yes" at step 314), image 606 displays a banner 608 extending from left to right at the bottom of the lateral display 115, but not covering the intended path or deviation, showing calculated parameters from the FMS 106 and selectable GUI object 610. The banner 608 displays the one or more calculated parameters received from the FMS 106, and comparing them to those of FIG. 4, 416, one can see they are the same. In this example the selectable GUI object 610 is a check, in other examples, it can be a button, be further rendered in green, or visually distinguished as a selectable option. Per step 318, responsive to a user selecting the selectable GUI object 610, the system 102 transmits a valid notification for the FP change to the FMS 106.

Accordingly, the present disclosure has provided several embodiments of systems and methods that coordinate with a flight management system (FMS) on-board an aircraft to determine whether a flight plan (FP) change generated by an external device is valid Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program 9 and program 11 or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system that coordinates with a flight management system (FMS) on-board an aircraft to determine whether a flight plan (FP) change generated by a portable external device is valid, comprising:
    a FP deviation module located on the portable external device, wherein the FP deviation module is configured to:
        receive an intended FP for the aircraft from the FMS of the aircraft;
        receive aircraft state data for the aircraft from a position-determining system of the aircraft;
        receive weather data from an external source;
        generate the FP change, which includes a deviation to the intended FP and a savings parameter resulting from the deviation to the intended FP, responsive to the weather data and the aircraft state data, wherein the savings parameter is associated with a parameter of the intended FP;
        generate a lateral display on a display device on the portable external device, the lateral display showing the intended FP;
        generate an alphanumeric overlay for display on the lateral display indicating therein the FP change; and
        transmit the FP change to the FMS;
    a reformulation module of the aircraft, the reformulation module in communication with the FMS and configured to:
        receive the FP change;
        construct a travel path that incorporates the deviation to the intended FP;
        generate a calculated parameter associated with the parameter of the intended FP for the travel path; and
        transmit the travel path and the calculated parameter to the FP deviation module; and
    the FP deviation module further configured to:
        receive the travel path and the calculated parameter from the FMS;

compare the calculated parameter to the savings parameter to corroborate the FP change generated by the portable external device;
generate a selectable graphical user interface (GUI) object for display with the alphanumeric overlay on the lateral display in response to the FP change being corroborated based on the comparison;
generate a warning GUI object for display with the alphanumeric overlay on the lateral display when the FP change is not corroborated based on the comparison; and
transmit a valid notification to the FMS responsive to detecting a user selection of the selectable GUI object.

2. The system of claim 1, wherein the FP deviation module is further configured to:
display an FMS page side by side with the lateral display, the FMS page showing the calculated parameter.

3. The system of claim 1, wherein the portable external device is a tablet.

4. The system of claim 1, wherein the portable external device is an electronic flight bag.

5. The system of claim 1, wherein the FP deviation module and the reformulation module communicate using a wireless communication protocol.

6. The system of claim 1, wherein the savings parameter is one of an estimated fuel on board (EFOB) and an estimated time of arrival (ETA).

7. The system of claim 1, wherein the reformulation module generates a temporary visualization of the FP change for display on an avionic display in a cockpit of the aircraft.

8. The system of claim 1, wherein the FP deviation module is further configured to display the calculated parameter in a banner on the lateral display.

9. The system of claim 1, wherein the FP deviation module is further configured to display the calculated parameter comprising at least one of distance, fuel, and an estimated time of arrival (ETA) in a banner on the lateral display.

10. A processor-implemented method for coordinating with a flight management system (FMS) on-board an aircraft to determine whether a flight plan (FP) change generated by a portable external device is valid, comprising:
at the portable external device, performing operations comprising:
receiving an intended FP for the aircraft from the FMS of the aircraft;
receiving aircraft state data for the aircraft from a position-determining system of the aircraft;
receiving weather data from an external source;
generating the FP change, which includes a deviation to the intended FP and a savings parameter resulting from the deviation to the intended FP, responsive to the weather data and the aircraft state data, wherein the savings parameter is associated with a parameter of the intended FP;
generating a lateral display on a display device on the portable external device, the lateral display showing the intended FP;
generating an alphanumeric overlay for display on the lateral display indicating therein the FP change; and
transmitting the FP change to the FMS;
at a reformulation module of the aircraft in communication with the FMS, performing operations comprising:
receiving the FP change;
constructing a travel path that incorporates the deviation to the intended FP;
generating a calculated parameter associated with the parameter of the intended FP for the travel path; and
transmitting the travel path and the calculated parameter to the portable external device; and
at the portable external device, further performing operations comprising:
receiving, from the FMS, the travel path and the calculated parameter for the travel path, generated by the FMS responsive to the FP change;
comparing the calculated parameter to the savings parameter to corroborate the FP change generated by the portable external device;
generating a selectable graphical user interface (GUI) object for display with the alphanumeric overlay on the lateral display in response to the FP change being corroborated based on the comparison;
generating a warning GUI object for display with the alphanumeric overlay on the lateral display when the FP change is not corroborated based on the comparison; and
transmitting a valid notification to the FMS responsive to detecting a user selection of the selectable GUI object.

11. The method of claim 10, further comprising displaying an FMS page side-by-side with the lateral display, the FMS page showing the calculated parameter.

12. The method of claim 10, wherein the portable external device is a tablet.

13. The method of claim 10, wherein the portable external device is an electronic flight bag.

14. The method of claim 10, wherein the savings parameter is one of an estimated fuel on board (EFOB) and an estimated time of arrival (ETA).

15. The method of claim 10, wherein the reformulation module generates a temporary visualization of the FP change for display on an avionic display in a cockpit of the aircraft.

16. A system that coordinates with a flight management system (FMS) on-board an aircraft to determine whether a flight plan (FP) change generated by a portable external device is valid, comprising:
a FP deviation module located on the portable external device, wherein the FP deviation module is configured to:
receive an intended FP from the FMS of the aircraft;
receive aircraft state data for the aircraft from a position-determining system of the aircraft;
receive weather data from an external source;
generate the FP change, which includes a deviation to the intended FP and a savings parameter resulting from the deviation to the intended FP, responsive to the weather data and the aircraft state data, wherein the savings parameter is associated with a parameter of the intended FP;
generate a lateral display on a display device on the external device, the lateral display showing the intended FP;
generate an alphanumeric overlay for display on the lateral display, the alphanumeric overlay indicating the FP change; and
transmit the FP change to the FMS;
a reformulation module of the aircraft, the reformulation module being configured to:
receive the FP change;
construct a travel path that incorporates the deviation to the intended FP;
generate a calculated parameter associated with the parameter of the intended FP for the travel path; and transmit the travel path and the calculated parameter to the portable external device; and the FP deviation module is further configured to:
receive, from the FMS, the travel path and the calculated parameter for the travel path, generated by the FMS responsive to the FP change;

compare the calculated parameter to the savings parameter to corroborate the FP change generated by the FP deviation module;

generate a selectable graphical user interface (GUI) object for display with the alphanumeric overlay on the lateral display in response to the FP change being corroborated based on the comparison;

generate a warning GUI object for display with the alphanumeric overlay on the lateral display when the FP change is not corroborated based on the comparison; and transmit a valid notification to the FMS responsive to detecting a user selection of the selectable GUI object.

17. The system of claim 16, further comprising a communications gateway circuit positioned operationally between the portable external device and the FMS and configured to wirelessly receive and transmit the FP change, the travel path, the calculated parameter, and the valid notification.

18. The system of claim 17, wherein the communications gateway circuit is located at a ground station.

19. The system of claim 17, wherein the savings parameter is an estimated fuel on board (EFOB).

20. The system of claim 17, wherein the savings parameter is an estimated time of arrival (ETA).

* * * * *